United States Patent

Pfitzner et al.

Patent Number: 5,454,967
Date of Patent: Oct. 3, 1995

[54] PHOSPHATE CONTAINING COOLANT MIXTURES WHICH ARE STABLE IN HARD WATER

[75] Inventors: Klaus Pfitzner, Ludwigshafen; Juergen Dehler, Neuhofen; Ladislaus Meszaros, Ludwigshafen, all of Germany

[73] Assignee: BASF Aktiengesellschaft, Ludwigshafen, Germany

[21] Appl. No.: 199,976

[22] Filed: Feb. 22, 1994

Related U.S. Application Data

[63] Continuation of Ser. No. 18,538, Feb. 17, 1993, abandoned.

[30] Foreign Application Priority Data

Feb. 18, 1992 [DE] Germany ............ 42 04 809.5

[51] Int. Cl.$^6$ .................................... C09K 5/60
[52] U.S. Cl. ............... 252/78.5; 252/73; 252/74; 252/75; 252/76; 252/79; 252/389.23
[58] Field of Search ................... 252/75, 74, 73, 252/70, 71

[56] References Cited

U.S. PATENT DOCUMENTS

| | | | |
|---|---|---|---|
| 5,064,552 | 11/1991 | Oppenlaender et al. | 252/78.3 |
| 5,080,818 | 1/1992 | Tachiiwa et al. | 252/75 |
| 5,118,434 | 6/1992 | Meyer et al. | 252/70 |

FOREIGN PATENT DOCUMENTS

| | | |
|---|---|---|
| 3832592 | 9/1988 | Germany . |
| 0311099 | 6/1988 | Japan . |

OTHER PUBLICATIONS

Abstract 90–033392/05 PN Japan Patent 01/1311099–A.
Derwent Publications, Ltd., World Patents Index, Acc. No. 90–033–392 (English–language abstract of JP 1,311,099). Jun. 06, 1988.
Derwent Publications, Ltd., World Patents Index, Acc. No. 90–040 944 (English–language abstract of JP 1,318,077). Jun. 17, 1988.

Primary Examiner—Paul Lieberman
Assistant Examiner—Necholus Ogden
Attorney, Agent, or Firm—Keil & Weinkauf

[57] ABSTRACT

Phosphate-containing, glycol-based coolant mixtures which are stable in hard water and are free of nitrites, silicates, amines and borates contain a) 0.5–3% by weight of ammonium and/or alkali metal phosphate
b) 2–5.5% by weight of ammonium or alkali metal benzoate
c) 0.2–1.5% by weight of ammonium or alkali metal molybdate
d) 0.2–0.8% by weight of ammonium or alkali metal nitrate
e) 0.05–0.4% by weight of benzotriazole
f) 0.05–0.4% by weight of tolyltriazole
g) 0.005–0.35% by weight of a water-soluble magnesium compound
h) 0.02–0.5% by weight of an oligomeric or polymeric carboxylic acid with a molecular weight of 1,000–100,000,
i) 0.05–5% by weight of water and the amount of glycol necessary to make up to 100% by weight.

5 Claims, No Drawings

PHOSPHATE CONTAINING COOLANT MIXTURES WHICH ARE STABLE IN HARD WATER

This application is a continuation of application Ser. No. 08/018,538, filed on Feb. 17, 1993.

The present invention relates to phosphate-containing, glycol-based coolant mixtures which are stable in hard water and are free of nitrites, silicates, amines and borates.

Present-day coolants for internal combustion engines usually contain glycols (ethylene or propylene glycol) as main component. In the cooling system they are diluted with water and are intended not only to act as an antifreeze but also to ensure good dissipation of heat. However, glycol/water mixtures are very corrosive at the high temperatures at which internal combustion engines operate, and this is why the various metals and their alloys which occur in the automobile cooling system must be adequately protected from corrosion.

These tasks are carried out by the various additives (corrosion inhibitors) present in coolants, eg. alkali metal nitrates, nitrites and silicates, benzoates, alkanolamines, phosphates, triazoles etc., besides sodium or calcium hydroxide and alkali metal borates, which provide an adequate alkali reserve to neutralize acidic oxidation products.

Coolant mixtures of these types are generally known and are described, for example, in Ullmann Enzyklopädie der technischen Chemie, 4th edition, Volume 12, pages 205 et seq., and Kirk-Othmer, Encyclopedia of Chemical Technology, 3rd Ed. 1979, Vol. 7, pages 133 et seq.

Nitrites are among the most effective inhibitors of iron corrosion but may react with secondary amines to form highly toxic nitrosamines. This may occur, in particular, when different types of coolant are mixed, which may arise, for example, when the automobile radiator is replenished.

Phosphates also provide excellent protection from corrosion for ferrous metals. In addition, alone or combined with silicate they effectively protect aluminum alloys. Alkali metal phosphates moreover provide an adequate alkali reserve.

Phosphate-containing coolants are, however, usually alkaline and have the particular disadvantage that dilution with hard water produces precipitates which result in breakdown of phosphate in the solution and adverse effects in the cooling system (poor dissipation of heat, blockage). This is why the recent patent literature describes phosphate- and nitrite-free coolants (eg. DE 38 32 592) which contain silicates and do not have these disadvantages and which provide excellent protection from corrosion of, in particular, aluminum even at high temperature.

However, elevated temperatures give rise to problems concerning the stability of the silicates which are present, ie. silicate precipitates are formed at elevated temperatures, which leads to the abovementioned difficulties.

JP-A 01-311099 (CA 112, 162047d) discloses antifreeze solutions which contain phosphates, nitrates, benzoates, molybdates, Mg compounds and mercaptobenzothiazole. However, precipitates which have serious adverse effects are also formed in these solutions after storage for several days.

It is an object of the present invention to make available coolant mixtures which provide excellent protection from high temperature corrosion for all metallic materials occurring in the cooling systems and, moreover, form no precipitate either at elevated temperatures or on prolonged storage or on dilution with hard water, and which are free of nitrites, silicates, amines and borates.

We have found that this object is achieved by phosphate-containing, glycol-based coolant mixtures which are stable in hard water and are free of nitrites, silicates, amines and borates, and which contain a) 0.5–3% by weight of ammonium and/or alkali metal phosphate b) 2–5.5% by weight of ammonium or alkali metal benzoate c) 0.2–1.5% by weight of ammonium or alkali metal molybdate d) 0.2–0.8% by weight of ammonium or alkali metal nitrate e) 0.05–0.4% by weight of benzotriazole f) 0.05–0.4% by weight of tolyltriazole g) 0.005–0.35% by weight of a water-soluble magnesium compound h) 0.02–0.5% by weight of an oligomeric or polymeric carboxylic acid with a molecular weight of 1,000–100,000, i) 0.05–5% by weight of water and the amount of glycol necessary to make up to 100% by weight.

It emerges, surprisingly, that the cooperation of the said components not only provides good protection from corrosion but also results in no precipitates being formed on addition of hard water (ie. with degrees of hardness above 14° German hardness or more than 2.5 mmol of alkaline earth metal ions/l) even when the coolant is stored for a long time or exposed to elevated temperatures.

A coolant mixture as claimed in claim 1 means the glycol-based formulation which has not yet been mixed with a larger amount of water ready for use.

Particularly preferred coolant mixtures are those whose component g) is magnesium nitrate and/or whose component a) is dipotassium hydrogen phosphate and/or in which the alkali metal ions in components b), c) and d) are sodium.

Examples of suitable oligomeric and polymeric carboxylic acids with a molecular weight ($M_n$, determined by GPC) of 1,000–100,000 are polyacrylic acid, oligomaleic acid and maleic acid/acrylic acid copolymers. The oligomeric or polymeric carboxylic acids preferably have a molecular weight of 2,000–10,000.

Employed as water-soluble phosphates are ammonium and/or alkali metal phosphates, where the phosphates can be ortho-, meta- or pyrophosphates. The orthophosphates can be primary, secondary and/or tertiary phosphates, and the secondary phosphates are preferred. Polyphosphates can likewise be employed because they are hydrolyzed to orthophosphates in aqueous medium. Potassium and sodium are preferred as alkali metal counter-ions.

The molybdates employed are conventional molybdates or, for example, polymolybdates as described in EP 248 346 B1.

The preferred amounts of the components a) to i) according to the invention are as follows:

a) 1.0–2.0% by weight b) 3.0–5.0% by weight c) 0.3–1.0% by weight d) 0.3–0.7% by weight e) 0.1–0.3% by weight f) 0.1–0.3% by weight g) 0.01–0.2% by weight h) 0.05–0.3% by weight i) 0.2–4% by weight.

The glycol employed is, in particular, monoethylene glycol, but other glycols, eg. diethylene glycol and/or propylene glycol, can also be present at least as additional components.

The coolant mixture can contain further conventional components such as antifoam or denaturing agents.

To prepare the cooling medium ready for use, the coolant mixture according to the invention is mixed with water to produce solutions which are expediently 10–80% by volume, preferably 20–60% by volume, in water.

The coolant mixtures according to the invention preferably have a pH of 7.5–9.5 and a viscosity of, for example, about 30 mm$^2$/s (DIN 51562). Their water content by the DIN 51123 method is expediently 2–4%. They are infinitely miscible not only with water but also with other conventional cooling media. The pour point of a 1:1 mixture with water is below −45° C. (DIN 51583), and the freezing point of this mixture is below −38° C. (ASTM D 1177).

EXAMPLES

1. A coolant mixture according to the invention was prepared with the following composition (all data in % by weight):

0.6% sodium molybdate dihydrate
   1.5% dipotassium hydrogen phosphate
   0.15% polyacrylic acid MW 4000 (as 50% strength aqueous solution)
   0.5% sodium nitrate
   0,035% magnesium nitrate hexahydrate
   4.5% sodium benzoate
   0.2% benzotriazole
   0.2% tolyltriazole
   0.01% denaturing agent dinatonium benzoate
   92.305% monoethylene glycol The mixture had a pH of 8.5, and the alkali reserve was 10.5 ml min (ASTM D 1121).

2. An aqueous solution which contained 33% by volume of the coolant was prepared from this coolant mixture. This cooling medium was subjected to ASTM D 1384-80 corrosion tests on copper, solder, brass, steel, gray cast iron and cast aluminum, and the weight decreases were determined.

The results were as follows:

| Metals or alloys | | Weight change in mg/cm$^2$ | |
| --- | --- | --- | --- |
| | | Measurements | Means |
| Copper | F—Cu | −0.01/+0.04/+0.01 | +0.01 |
| Solder | LSn30 | −0.02/−0.01/−0.03 | −0.02 |
| Brass | Ms63 | +/−0.00/+0.01/+0.03 | +0.01 |
| Steel | H II | +/−0.00/+0.06/+0.01 | +0.02 |
| Gray cast iron | GG26 | −0.04/−0.07/−0.01 | −0.04 |
| Cast aluminum | GA1Si6Cu4 | −0.11/+0.05/−0.01 | −0.02 |

In addition, an ASTM D 4340-84 heat-transfer test was carried out on a 25% by volume solution in water of the coolant from 1. The result was as follows:

| Test metal: | Weight change in mg/cm$^2$/week | |
| --- | --- | --- |
| | Measurements | Mean |
| Cast aluminum GA1Si6Cu4 | +0.18/+0.13 | +0.16 |

3. Comparative mixture disclosed in JP-A 01-311099

The comparative mixture was the following, prepared as disclosed in JP-A 01-311099 (in each case % by weight):

| | |
| --- | --- |
| 0.4% | sodium mercaptobenzotriazole |
| 0.5% | sodium molybdate |
| 0.4% | sodium nitrate |
| 0.02% | magnesium nitrate |
| 5.0% | sodium benzoate |
| 1.0% | KOH |
| 1.5% | H$_3$PO$_4$ |
| 91.18% | monoethylene glycol (95% MEG + 5% H$_2$O) |

The mixture was adjusted to pH 8.5 with 0.09% by weight of 85% strength H$_3$PO$_4$.

4. The following storage tests were carried out:
   a) Storage of the concentrates at 60° C. for 7d
   b) Storage of 40% by volume solutions in water of 20° German hardness at 90° C. for 7d Results:

a) Storage of the concentrates at 60° C. for 7d

| | Coolant according to the invention (from 1.) | Coolant according to JP-A 311099 (from 3.) |
| --- | --- | --- |
| Appearance: | | |
| before test | colorless, clear | colorless, clear; pale sediment on storage at RT |
| after test | yellowish, clear | colorless, clear; white crystalline sediment |
| Sediment after test, % by vol.: | | |
| at 60° C. | none | 1.5 (+ on vessel wall) |
| at RT | none | 6.5 |
| Residue on drying, mg/100 ml of solution | — | 1,360 | b) Storage of 40% by volume solutions in water of 20° German hardness at 90° C. for 7d

| | Coolant according to the invention (from 1.) | Coolant according to JP-A 311099 (from 3.) |
| --- | --- | --- |
| Appearance: | | |
| before test | colorless, clear | colorless, clear; pale sediment on storage at RT |
| after test | colorless, clear | colorless, clear; white translucent |

| | Coolant according to the invention (from 1.) | Coolant according to JP-A 311099 (from 3.) |
|---|---|---|
| Sediment after test, % by vol.: | | sediment |
| at 60° C. | none | 7 |
| at RT | none | 7 |
| Residue on drying, mg/100 ml of solution | — | 98.8 |

(To determine the residue on drying, the solutions were filtered through a 589.1/0.00003 gr black ribbon filter. The residue was dried at 60° C. for 4 h.)

It is evident from the Examples that the coolant mixtures according to the invention not only provide excellent protection from corrosion but also, despite the phosphate content, have very good storage stability so that no precipitates occur even on dilution with hard water.

We claim:

1. A phosphate-containing and glycol-based coolant mixture which is stable in hard water and is free of nitrites, silicates, amines and borates, which consists essentially of
    a) 0.5–3% by weight of ammonium or alkali metal phosphate, or a mixture of both
    b) 2 –5.5% by weight of ammonium or alkali metal benzoate
    c) 0.2–1.5% by weight of ammonium or alkali metal molybdate
    d) 0.2–0.8% by weight of ammonium or alkali metal nitrate
    e) 0.05–0.4% by weight of benzotriazole
    f) 0.05–0.4% by weight of tolyltriazole
    g) 0,005–0.35% by weight of a water-soluble magnesium compound
    h) 0.02–0.5% by weight of a polymeric carboxylic acid with a molecular weight of 1,000–100,000 selected from the group consisting of polyacrylic acid and maleic acid/acrylic acid copolymers
    i) 0.05–5% by weight of water and 82.55–96.925% by weight of glycol.

2. A coolant mixture as claimed in claim 1, wherein component g) is magnesium nitrate and component h) is polyacrylic acid with a molecular weight of 2,000–10,000.

3. A coolant mixture as claimed in claim 1, wherein the alkali metal ion in component a) is potassium and the alkali metal ions in components b), c) and d) are sodium.

4. A coolant mixture as claimed in claim 1, which contains the said components a) to i) in the following amounts:
    a) 1.0–2.0% by weight
    b) 3.0–5.0% by weight contains c) 0.3–1.0% by weight
    d) 0.3–0.7% by weight
    e) 0.1–0.3% by weight
    f) 0.1–0.3% by weight
    g) 0.01–0.2% by weight
    h) 0.05–0.3% by weight
    i) 0.2–4% by weight.

5. A coolant medium which contains 10–80% by volume of a coolant mixture as claimed in claim 1 and 90–20% by volume of water.

* * * * *

UNITED STATES PATENT AND TRADEMARK OFFICE
CERTIFICATE OF CORRECTION

PATENT NO.: 5,454,967

DATED: October 3, 1995

INVENTOR(S): PFITZNER et al.

It is certified that error appears in the above-identified patent and that said Letters Patent is hereby corrected as shown below:

Column 6, claim 1, line 4, "0,005" should read --0.005--.

Column 6, claim 4, line 24, delete "contains".

Column 6, claim 4, line 24, "c) 0.3-1.0% by weight" should be on the next line.

Signed and Sealed this

Thirtieth Day of January, 1996

Attest:

BRUCE LEHMAN

Attesting Officer

Commissioner of Patents and Trademarks